(12) United States Patent
Li et al.

(10) Patent No.: US 11,841,320 B1
(45) Date of Patent: Dec. 12, 2023

(54) METHOD FOR MEASURING CONCENTRATIONS OF MULTIPLE GASES BY USING INFRARED BAND LASER LIGHT

(71) Applicant: XINJIANG TECHNICAL INSTITUTE OF PHYSICS AND CHEMISTRY, CHINESE ACADEMY OF SCIENCES, Urumqi (CN)

(72) Inventors: Linjun Li, Urumqi (CN); Shilie Pan, Urumqi (CN); Xiaoming Duan, Urumqi (CN); Yu Zhou, Urumqi (CN); Qianqian Hao, Urumqi (CN); Yingjie Shen, Urumqi (CN); Yuqiang Yang, Urumqi (CN); Fangfang Zhang, Urumqi (CN); Xin He, Urumqi (CN)

(73) Assignee: XINJIANG TECHNICAL INSTITUTE OF PHYSICS AND CHEMISTRY, CHINESE ACADEMY OF SCIENCES, Urumqi (CN)

( * ) Notice: Subject to any disclaimer, the term of this patent is extended or adjusted under 35 U.S.C. 154(b) by 0 days.

(21) Appl. No.: 18/220,829

(22) Filed: Jul. 12, 2023

(30) Foreign Application Priority Data

Nov. 3, 2022 (CN) ......................... 202211369441.X

(51) Int. Cl.
*G01N 21/3504* (2014.01)
*G01N 21/3581* (2014.01)
(Continued)

(52) U.S. Cl.
CPC ....... *G01N 21/3504* (2013.01); *G01N 21/359* (2013.01); *G01N 21/3581* (2013.01); *H01S 3/083* (2013.01); *H01S 3/0816* (2013.01)

(58) Field of Classification Search
CPC .......... G01N 21/3504; G01N 21/3581; G01N 21/359; H01S 3/0816; H01S 3/083
See application file for complete search history.

(56) References Cited

U.S. PATENT DOCUMENTS

| | | | |
|---|---|---|---|
| 6,331,993 B1 | 12/2001 | Brown | |
| 2008/0111077 A1 | 5/2008 | Miller | |

(Continued)

FOREIGN PATENT DOCUMENTS

| | | |
|---|---|---|
| CN | 1356538 A | 7/2002 |
| CN | 102842849 A | 12/2012 |

(Continued)

OTHER PUBLICATIONS

Hualong Chen, et al., Recent advances of low-dimensional materials in Mid- and Far-infrared photonics, Applied Materials Today, 2020, pp. 1-23, vol. 21, 100800.

(Continued)

*Primary Examiner* — Jamil Ahmed
(74) *Attorney, Agent, or Firm* — Bayramoglu Law Offices LLC

(57) ABSTRACT

A method for measuring concentrations of multiple gases by using an infrared band laser light includes: pumping Ho crystal by using a 1.9 μm single thulium-doped solid-state laser to obtain a 2 μm band near-infrared laser output; controlling a light-emitting angle of 2 μm band laser light; allowing the 2 μm laser light to enter a first measurement cell at a first emergent angle, and measuring a concentration of methane gas in the first measurement cell; generating and introducing the 3-5 μm mid-infrared laser light into a second measurement cell to measure concentrations of ammonia gas and carbon monoxide in the second measurement cell; generating and introducing the 6-12 μm far-infrared laser light into a third measurement cell to measure concentrations of carbon dioxide, acetylene, ethylene and ethane gas in the third measurement cell.

8 Claims, 3 Drawing Sheets

(51) Int. Cl.
*G01N 21/359* (2014.01)
*H01S 3/083* (2006.01)
*H01S 3/081* (2006.01)

(56) References Cited

U.S. PATENT DOCUMENTS

| | | | |
|---|---|---|---|
| 2008/0111993 | A1 | 5/2008 | Miller |
| 2010/0246610 | A1* | 9/2010 | Mirov ............... C30B 31/02 372/20 |

FOREIGN PATENT DOCUMENTS

| | | | |
|---|---|---|---|
| CN | 103259177 | A | 8/2013 |
| CN | 104779515 | A | 7/2015 |
| CN | 105098579 | A | 11/2015 |
| CN | 105119137 | A | 12/2015 |
| CN | 105552708 | A | 5/2016 |
| CN | 105633789 | A | 6/2016 |
| CN | 106908389 | A | 6/2017 |
| CN | 107579410 | A | 1/2018 |
| CN | 108258575 | A | 7/2018 |
| CN | 108827912 | A | 11/2018 |
| CN | 110048298 | A | 7/2019 |
| CN | 110797750 | A | 2/2020 |
| CN | 110927096 | A | 3/2020 |
| CN | 110932078 | A | 3/2020 |
| CN | 111398215 | A | 7/2020 |
| JP | 2008241340 | A | 10/2008 |
| JP | 2018036228 | A | 3/2018 |
| RU | 2714527 | C1 | 2/2020 |

OTHER PUBLICATIONS

Li Chong, et al., Progress of mid-infrared optical parametric oscillator, Chinese Optics, 2016, pp. 615-624, vol. 9 No.6.

Yingjie Shen, et al., Continuous-wave mode-locked Tm:YAG laser with GaAs-based SESAM, Infrared Physics and Technology, 2020, pp. 1-4, vol. 111, 103539.

Kan Rui-Feng, et al., Tunable Diode Laser Absorption Spectrometer Monitors the Ambient Methane with High Sensitivity, Chinese Journal of Lasers, 2005, pp. 1217-1220, vol. 32, No. 9.

Chen Yi, et al., Research Progress of Nonlinear Crystal Applied in Mid-and Long-wave Infrared Solid-state Laser, Journal of Synthetic Crystals, 2020, vol. 49 No. 8.

* cited by examiner

METHOD FOR MEASURING CONCENTRATIONS OF MULTIPLE GASES BY USING INFRARED BAND LASER LIGHT

CROSS REFERENCE TO THE RELATED APPLICATIONS

This application is based upon and claims priority to Chinese Patent Application No. 202211369441.X, filed on Nov. 3, 2022, the entire contents of which are incorporated herein by reference.

TECHNICAL FIELD

The present disclosure relates to the field of laser measurement, and in particular, to a method for measuring concentrations of multiple gases by using an infrared band laser light.

BACKGROUND

In industry and commerce, it is usually required to accurately measure harmful gases within a certain space to ensure safety within the space. Currently, harmful gases that need to be prevented include methane, ammonia gas, carbon monoxide, carbon dioxide, acetylene, ethylene, ethane, etc. With regard to whether harmful gases meet specific purity limits and/or whether the emission of these gases meets environmental regulations, typical applications such as process control, emission and environmental monitoring, and safety and air conditioning require accurate concentration measurement.

Wavelength modulation spectrum is a way to enhance sensitivity of gas measurement, and is especially important when a relatively low concentration is measured. Usually, the concentration of a gas to be measured is calculated by measuring spectral intensities of incident light and emergent light. However, the existing measurement methods have low precision that may be acceptable for some cases with low requirements, but these methods cannot accurately measure concentrations of harmful gases for some environments with high requirements for precision. In addition, existing gas concentration measurement methods can only implement single measurement and cannot implement simultaneous measurement of concentrations of multiple harmful gases. Therefore, it is highly desirable to develop a method capable of implementing simultaneous measurement of concentrations of multiple harmful gases.

SUMMARY

To solve the technical problem that existing gas concentrations cannot be measured simultaneously, the present disclosure provides a method for measuring concentrations of multiple gases by using an infrared band laser light.

The present disclosure provides a method for measuring concentrations of multiple gases, including the following steps:

- step S1: pumping Ho crystal by using a 1.9 µm narrow-linewidth single thulium-doped solid-state laser to obtain a 2 µm narrow-linewidth near-infrared laser output;
- step S2: adjusting a light-emitting angle by using an electronically controlled rotating mirror, and setting three gears, such that 2 µm laser light is emitted in different directions under the three gears respectively;
- step S3: controlling the light-emitting angle of the 2 µm laser light, such that the 2 µm laser light enters a gas measurement cell at a first emergent angle, and measuring a concentration of methane gas in the gas measurement cell;
- step S4: controlling the light-emitting angle of the 2 µm laser light, such that the 2 µm laser light enters a first four-mirror ring resonator at a second emergent angle, and is coupled to a first nonlinear crystal in the first four-mirror ring resonator to generate 3-5 µm mid-infrared laser light, and introducing the 3-5 µm mid-infrared laser light into the gas measurement cell to measure a concentration of ammonia gas and/or a concentration of carbon monoxide in the gas measurement cell; and
- step S5: controlling the light-emitting angle of the 2 µm laser light, such that the 2 µm laser light enters a second four-mirror ring resonator at a third emergent angle, and is coupled to a second nonlinear crystal in the second four-mirror ring resonator to generate 6-12 µm far-infrared laser light, and introducing the 6-12 µm far-infrared laser light into the gas measurement cell to measure a concentration of carbon dioxide, a concentration of acetylene, a concentration of ethylene and/or a concentration of ethane in the gas measurement cell.

Further, the first four-mirror ring resonator includes a first input mirror, a first reflective mirror, a second reflective mirror and a first output mirror that are sequentially arranged along an optical path, where the first input mirror is coated with a 2 µm high-transmission film and a 3-5 µm high-reflection film, each of the first reflective mirror and the second reflective mirror is coated with a 3-5 µm high-reflection film, and the first output mirror is coated with a 3-5 µm partial-transmission film.

Further, the second four-mirror ring resonator includes a second input mirror, a third reflective mirror, a fourth reflective mirror and a second output mirror that are sequentially arranged along an optical path, where the second input mirror is coated with a 2 µm high-transmission film and a 6-12 µm high-reflection film, each of the third reflective mirror and the fourth reflective mirror is coated with a 6-12 µm high-reflection film, and the second output mirror is coated with a 6-12 µm partial-transmission film.

Further, the method further includes:

- introducing measurement lights emitted from the gas measurement cell into a spectrometer to obtain spectra of respective measured lights; and
- analyzing the spectra in the spectrometer and then determining the concentration of the methane gas, the concentration of the ammonia gas, the concentration of the carbon monoxide, the concentration of the carbon dioxide, the concentration of the acetylene, the concentration of the ethylene and/or the concentration of the ethane in the gas measurement cell.

Further, the electronically controlled rotating mirror includes an electronic control platform and a triangular prism arranged on the electronic control platform, where an angle of the triangular prism is finely adjusted by the electronic control platform, such that an angle of incident light on a same surface of the triangular prism changes to control emission of the 2 µm laser light from another light-emitting surface of the triangular prism in different directions.

Further, the electronically controlled rotating mirror includes an electronic control platform and a trihedral rotating mirror arranged on the electronic control platform, where an angle of the trihedral rotating mirror is adjusted by the electronic control platform, such that an angle of incident light on each surface of the trihedral rotating mirror changes to control emission of the 2 μm laser light from the trihedral rotating mirror in different directions.

Further, the trihedral rotating mirror includes a rotating shaft and three rotating mirrors arranged around the rotating shaft, where each of mirror surfaces of the rotating mirrors faces a side opposite to the rotating shaft, and an included angle formed between the mirror surface of one of the rotating mirrors and the rotating shaft is directed differently from an included angle formed between the mirror surface of another one of the rotating mirrors and the rotating shaft.

Further, the mirror surface of one of the rotating mirrors is parallel to the rotating shaft.

Further, a rotation speed of the trihedral rotating mirror is adjusted by the electronic control platform, such that an angle of incident light on each surface of the trihedral rotating mirror continuously changes to control sequential emission of the 2 μm laser light from the trihedral rotating mirror in different directions.

Further, the step of analyzing the spectra in the spectrometer and then determining the concentration of the methane gas, the concentration of the ammonia gas, the concentration of the carbon monoxide, the concentration of the carbon dioxide, the concentration of the acetylene, the concentration of the ethylene and/or the concentration of the ethane in the gas measurement cell includes:

obtaining absorption spectra at three wavelengths by the spectrometer, and obtaining absorption parameters of corresponding wavelengths based on the absorption spectra; and calculating the concentration of each gas of the multiple gases based on the absorption parameters, where the concentration of each gas meets the following formula:

$$M = \frac{2\pi Sc}{Lh\omega B},$$

where M is a concentration of a gas, c is a light speed, h is a Planck constant, $$\omega = \frac{c}{\lambda}$$

is a frequency of a gas absorption peak, λ is an absorption peak wavelength of the corresponding gas, B is a gas absorption transition constant, L is a length of a gas sample cell, and S is an area enclosed by the gas absorption peak.

The present disclosure has the beneficial effects that according to the present disclosure, the light-emitting angle is adjusted by using the electronically controlled rotating mirror, and the three gears are set, such that 2 μm laser light is emitted in different directions under the three gears respectively, thereby generating near-infrared band measurement laser light, mid-infrared band measurement laser light and far-infrared band measurement laser light, and the laser light is inputted into gas measurement cells; concentrations of multiple gases can be simultaneously measured in the near-infrared band, the mid-infrared band, and the far-infrared band by a light source system through adjustment, and the concentration of each gas of the multiple gases can be calculated by using the above calculation formula met by the various measurement gases.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and those of ordinary skill in the art can further derive other accompanying drawings from these accompanying drawings without creative efforts.

DETAILED DESCRIPTION OF THE EMBODIMENTS

Figure 1:
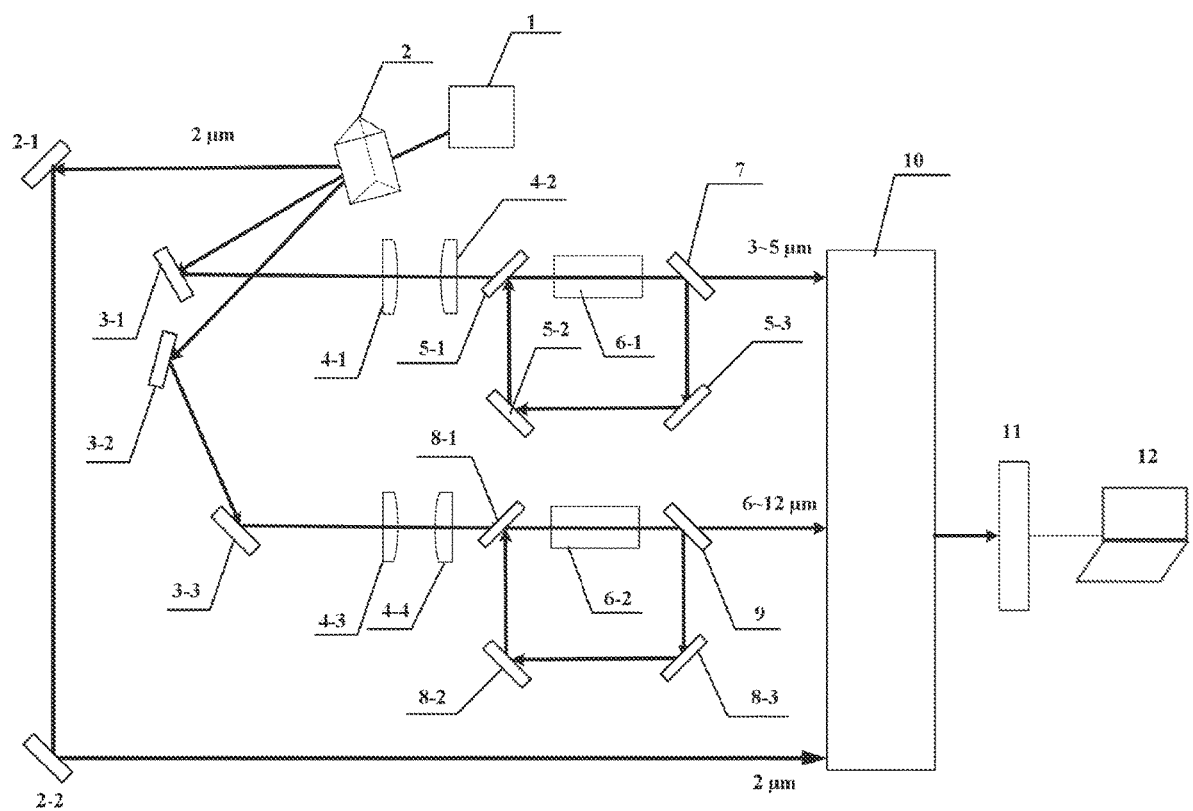
FIG. 1 is a schematic structural diagram of a gas measurement device according to an embodiment of the present disclosure.

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

2-12 μm band mid-infrared laser light has a wide application prospect in the fields of environmental gas monitoring, basic physics, laser medical treatment, remote sensing detection, laser radar, military confrontation, etc. Among the technical means to obtain a 2 μm laser output, the laser output may be directly generated by $Tm^{3+}/Ho^{3+}$-doped crystals. The most effective means to obtain a 3-5 μm laser output is to down-convert the frequency of 2 μm band laser light by means of an optical parametric oscillator (OPO). Main technical ways to obtain a 6-12 μm laser output are difference frequency (DF), optical parametric generation (OPG), the OPO, and an optical parametric amplifier (OPA). Compared with DF and OPG technologies, OPO and OPA technologies feature simple devices, can obtain an output with a high repetition frequency and high average power, and may allow a suitable nonlinear crystal to be selected according to actual needs. Among chalcopyrite nonlinear crystals, $ZnGeP_2$ (ZGP) crystal is one of the most effective nonlinear crystals to produce mid-infrared and far-infrared laser outputs (including 3-5 μm and 6-12 μm). The $ZnGeP_2$ crystal has a large nonlinear coefficient (75 μm/V) and a high thermal conductivity (0.18 W/m·K). $ZnGeP_2$—OPO and the OPA are effective methods to realize 8-12 μm nonlinear optical frequency conversion.

However, in the field of gas measurement, the measurement laser light of a single band cannot meet a requirement for simultaneous measurement of multiple gases. Currently, there is no crystal or optical fiber having output laser light that can cover laser light bands ranging from near-infrared to mid-far-infrared, while a quantum well semiconductor laser that can cover more bands has low output laser power, and the beam quality of the output light is not good enough.

The coverage of the output wavelength of the optical fiber laser is limited by doped rare earth ions, and the laser output power generated by a nonlinear effect is also low, which does not facilitate practical application.

According to the present disclosure, the light-emitting angle is adjusted by using the electronically controlled rotating mirror, and the three gears are set, such that 2 μm laser light is emitted in different directions under the three gears respectively, thereby generating near-infrared band measurement laser light, mid-infrared band measurement laser light and far-infrared band measurement laser light, and the laser light is inputted into gas measurement cells; and through adjustment of the different gears, concentrations of multiple gases can be simultaneously measured by a light source, thereby simplifying a gas measurement method.

Preferred embodiments of the present disclosure are described in detail below with reference to the accompanying drawings.

For a light source part, as shown in FIG. 1, a single thulium ($Tm^{3+}$)-doped solid-state laser with a narrow linewidth of 1.9 μm (for example, below 2 nm) is used to pump Ho crystal to obtain a high-energy Q-switched laser output with a narrow linewidth of 2 μm (for example, below 2 nm), and nonlinear crystals ($ZnGeP_2$) with different angles are pumped by using 2 μm laser light to obtain 3-5 μm and 6-12 μm mid-infrared and far-infrared measurement laser outputs. Specifically, three types of detection laser light are included: (1) 2 μm acousto-optic Q-switched single Ho-doped laser pumped by a Tm:lithium yttrium fluoride (YLF) laser; (2) a 3-5 μm four-mirror ring cavity optical parametric oscillator pumped by a 2 μm Ho laser; and (3) a 6-12 μm four-mirror ring cavity optical parametric oscillator pumped by 2 μm HO laser.

An optional doping matrix of single $Ho^{3+}$-doped laser crystals includes lithium yttrium fluoride (YLF), lithium lutetium fluoride (LuLF), yttrium aluminate (YAP), lutetium aluminum garnet (LuAG), yttrium vanadate ($YVO_4$), yttrium aluminum garnet (YAG), etc. The optical parametric oscillation resonator is composed of four flat mirrors, one of which is used as an OPO output mirror and coated with a 3-5 μm/6-12 μm partial-transmission film; and any one of the other three flat mirrors may be used as an input mirror, one surface of which is coated with a 2 μm high-transmission film, and the other surface coated with a 2 μm high-transmission film and a 3-5 μm/6-12 μm high-reflection film. An optical parametric oscillation crystal is $ZnGeP_2$ crystal, with both ends coated with a 2 μm high-transmission film and a 3-5 μm/6-12 μm high-transmission film.

A light-emitting angle of Ho laser 1 is adjusted by electrically controlled rotating mirror 2, and three gears are provided to accurately control the light-emitting angle of the Ho laser. 2 μm laser light is achieved at the first gear; at the second gear, the laser light is reflected into a 3-5 μm optical parametric oscillator by means of plane reflector 3-1. Lens 4-1 and lens 4-2 form an optical coupling system to couple the 2 μm laser light to nonlinear crystal 6-1 to generate 3-5 μm measurement laser light. At the third gear, the laser light is reflected into a 6-12 μm optical parametric oscillator by means of plane reflector 3-2 and plane reflector 3-3. Lens 4-3 and lens 4-4 form an optical coupling system to couple the 2 μm laser light to nonlinear crystal 6-2 to generate 6-12 μm measurement laser light.

Ho crystal is Ho:YAG crystal with a length of 100 mm and an $Ho^{3+}$ doping concentration of 0.8 at. %. The Tm:YLF laser has an emission wavelength of 1908 nm, an output mirror of the Ho laser has a curvature radius of −300 mm and a transmittance of 50% for 2.1 μm laser light, and an OPO output mirror has a transmittance of 50% for 3-5 μm/6-12 μm laser light.

With the above parameters, 2.1 μm pulsed laser light of 105 W can be obtained. When 2.1 μm Ho:YAG pump laser light of 105 W is injected into two $ZnGeP_2$ optical parametric oscillators with different angles, a stable 3-5 μm mid-infrared laser output of 40 W and a stable 6-12 μm far-infrared laser output of 10 W can be obtained, which facilitates the obtaining of a clear measurement spectrum, so as to accurately measure a concentration of a gas to be detected.

Figure 3:
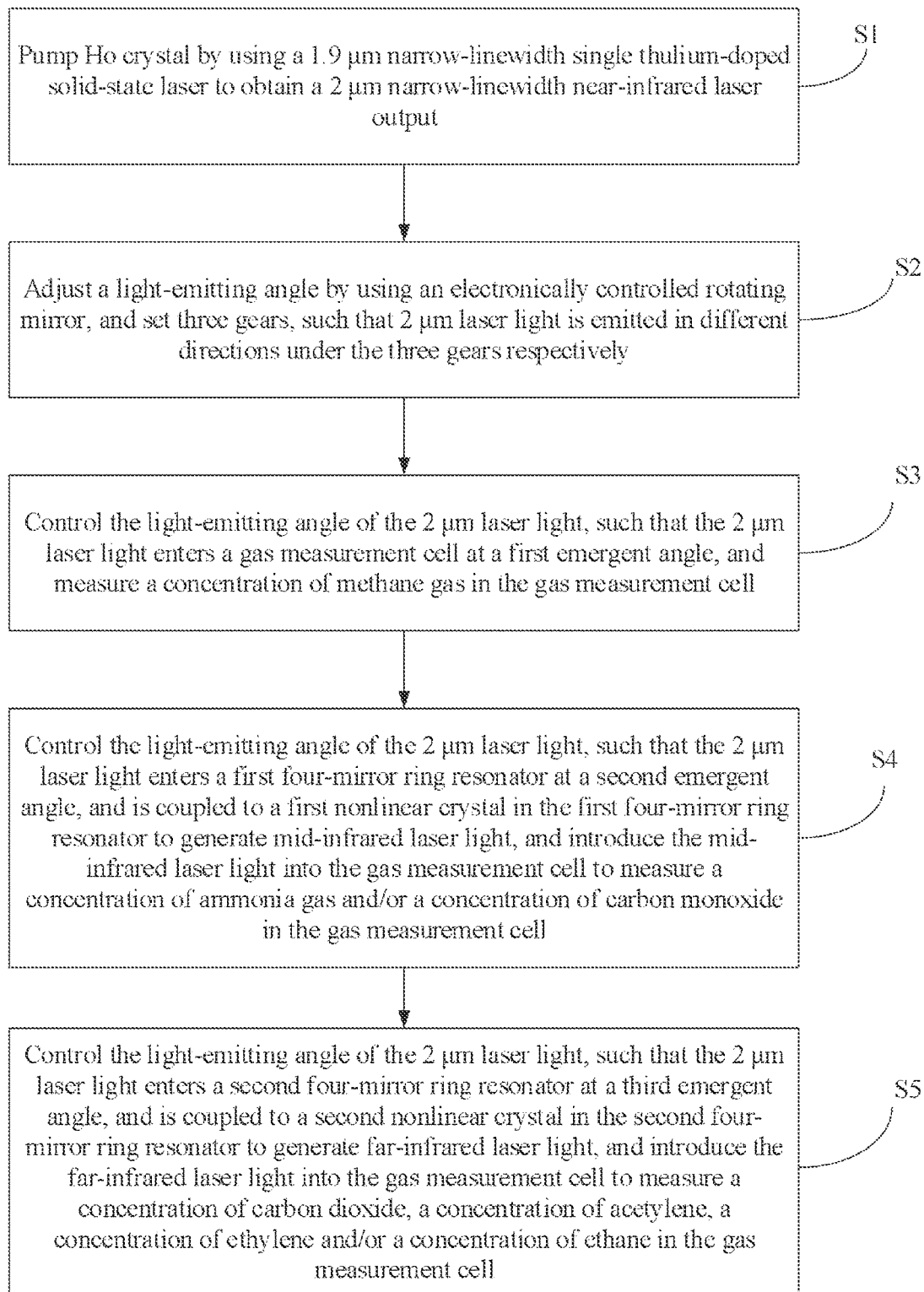
FIG. 3 is a schematic flowchart of a method for measuring concentrations of multiple gases according to an embodiment of the present disclosure.

As shown in FIG. 3, a method for measuring concentrations of multiple gases according to the present disclosure includes the following steps.

Step S1: Ho crystal is pumped by using a 1.9 μm narrow-linewidth single thulium ($Tm^{3+}$)-doped solid-state laser to obtain a 2 μm narrow-linewidth near-infrared laser output.

step S2: A light-emitting angle is adjusted by using electronically controlled rotating mirror 2, and three gears are set, such that 2 μm laser light is emitted in different directions under the three gears respectively.

Step S3: The light-emitting angle of the 2 μm laser light is controlled, such that the 2 μm laser light is reflected by reflective mirror 2-1 and reflective mirror 2-2 at a first emergent angle and then enters gas measurement cell 10, and a concentration of methane gas in the gas measurement cell 10 is measured, where the methane has an absorption peak around 2 μm.

Step S4: The light-emitting angle of the 2 μm laser light is controlled, such that the 2 μm laser light enters a first four-mirror ring resonator at a second emergent angle, and is coupled to a first nonlinear crystal in the first four-mirror ring resonator to generate 3-5 μm mid-infrared laser light, and the 3-5 μm mid-infrared laser light is introduced into the gas measurement cell 10 to measure a concentration of ammonia gas and/or a concentration of carbon monoxide in the gas measurement cell, where the ammonia gas has an absorption peak around 4.235 μm, and the carbon monoxide has an absorption peak around 4.0298 μm. Through OPO adjustment, the narrow-linewidth measurement laser light that meets the requirements of being around 4.235 μm or around 4.0298 μm can be outputted in the range of 3-5 μm, so as to measure the concentration(s) of the ammonia gas and/or the carbon monoxide in the mixed gas.

Step S5: The light-emitting angle of the 2 μm laser light is controlled, such that the 2 μm laser light enters a second four-mirror ring resonator at a third emergent angle, and is coupled to a second nonlinear crystal in the second four-mirror ring resonator to generate 6-12 μm far-infrared laser light, and the 6-12 μm far-infrared laser light is introduced into the gas measurement cell 10 to measure a concentration of carbon dioxide, a concentration of acetylene, a concentration of ethylene and/or a concentration of ethane in the gas measurement cell. The carbon dioxide gas has an absorption peak around 6.77 μm, the acetylene gas has an absorption peak around 6.88 μm, the ethylene gas has an absorption peak around 9.74 μm or 10.17 μm, and the ethane gas has an absorption peak around 6.3041 μm or 11.82 μm. Through OPO adjustment, the narrow-linewidth measurement laser light that meets the above wavelength can be outputted in the range of 6-12 μm, so as to measure the concentration(s) of the carbon dioxide, the acetylene, the ethylene and/or the ethane in the mixed gas.

Further, the first four-mirror ring resonator includes first input mirror 5-1, first reflective mirror 5-3, second reflective mirror 5-2 and first output mirror 7 that are sequentially arranged along an optical path, where the first input mirror 5-1 is coated with a 2 μm high-transmission film and a 3-5 μm high-reflection film, each of the first reflective mirror 5-3 and the second reflective mirror 5-2 is coated with a 3-5 μm high-reflection film, and the first output mirror 7 is coated with a 3-5 μm partial-transmission film. With the design of the four-mirror ring cavity, the 2 μm laser light is no longer affected by a feedback, and the whole laser light source has high stability.

Further, the second four-mirror ring resonator includes second input mirror 8-1, third reflective mirror 8-3, fourth reflective mirror 8-2 and second output mirror 9 that are sequentially arranged along an optical path, where the second input mirror 8-1 is coated with a 2 μm high-transmission film and an 8-12 μm high-reflection film, each of the third reflective mirror 8-3 and the fourth reflective mirror 8-2 is coated with a 6-12 μm high-reflection film, and the second output mirror 9 is coated with a 6-12 μm partial-transmission film. With the design of the four-mirror ring cavity, the 2 μm laser light is no longer affected by a feedback, and the whole laser light source has high stability.

Further, the method further includes the following steps.

Measurement lights emitted from the gas measurement cell 10 are introduced into spectrometer 11 to obtain spectra of respective measured lights.

After a spectral image in the spectrometer 11 is obtained, the spectra in the spectrometer is analyzed by means of data processing center 12 and then the concentration of methane gas, the concentration of ammonia gas, the concentration of carbon monoxide, the concentration of carbon dioxide, the concentration of acetylene, the concentration of ethylene and/or the concentration of ethane gas in the gas measurement cell are determined.

In some embodiments, as shown in FIG. 1, the electronically controlled rotating mirror includes an electronic control platform and a triangular prism arranged on the electronic control platform, where an angle of the triangular prism is finely adjusted by the electronic control platform, such that an angle of incident light on a same surface of the triangular prism changes to control emission of the 2 μm laser light from another light-emitting surface of the triangular prism in different directions.

Figure 2:
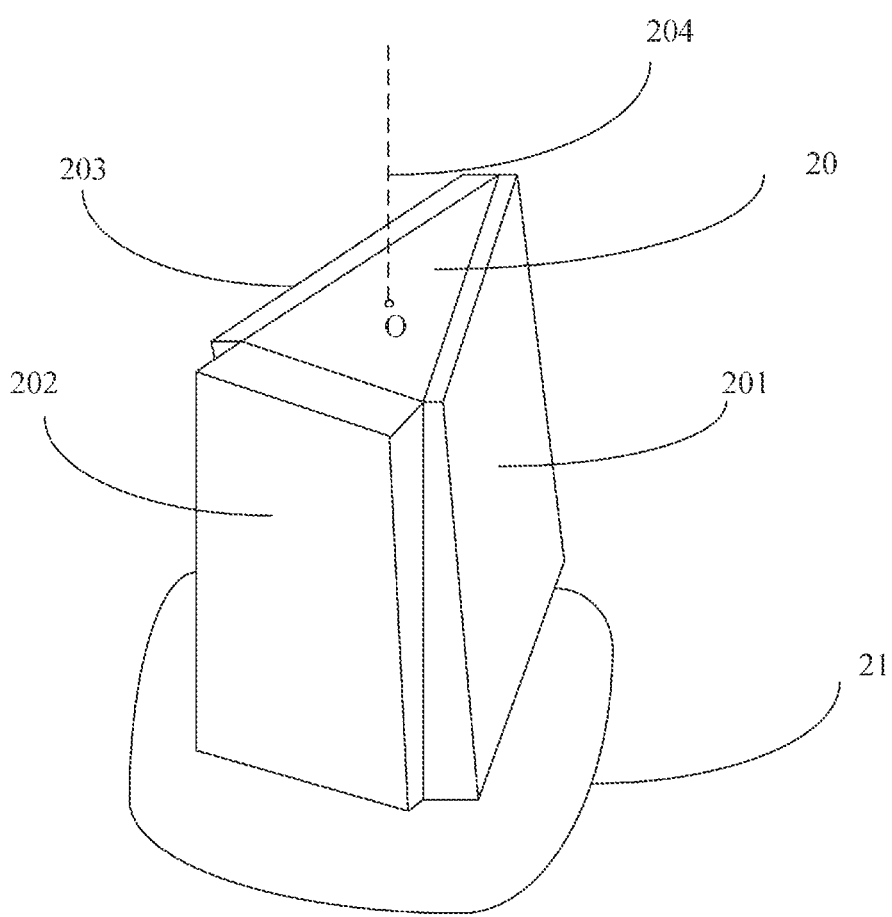
FIG. 2 is a schematic structural diagram of an electronically controlled rotating mirror of a gas measurement device according to another embodiment of the present disclosure.

In some other embodiments, as shown in FIG. 2, the electronically controlled rotating mirror includes electronic control platform 21 and a trihedral rotating mirror 20 arranged on the electronic control platform, where an angle of the trihedral rotating mirror 20 is adjusted by the electronic control platform 21, such that an angle of incident light on each surface of the trihedral rotating mirror 20 changes to control emission of the 2 μm laser light from the trihedral rotating mirror in different directions.

Further, the trihedral rotating mirror 20 includes rotating shaft 204 and three rotating mirrors arranged around the rotating shaft 204, which include first rotating mirror 201, second rotating mirror 202, and third rotating mirror 203, where each of mirror surfaces of the first rotating mirror 201, the second rotating mirror 202 and the third rotating mirror 203 faces a side opposite to the rotating shaft 204, and an included angle formed between the mirror surface of one of the rotating mirrors and the rotating shaft is directed differently from an included angle formed between the mirror surface of another one of the rotating mirrors and the rotating shaft. For example, an included angle formed between the mirror surface of the first rotating mirror 201 and the rotating shaft 204 is directed differently from an included angle formed between the mirror surface of the second rotating mirror 202 and the rotating shaft 204. The included angle formed between the mirror surface of the first rotating mirror 201 and the rotating shaft 204 is upward, the included angle formed between the mirror surface of the second rotating mirror 202 and the rotating shaft 204 is downward, and the included angles are both greater than zero and less than 45°. The mirror surface of one rotating mirror, such as the third rotating mirror 203, is parallel to the rotating shaft 204. The included angle formed between the first rotating mirror 201 and the rotating shaft 204, the included angle formed between the second rotating mirror 202 and the rotating shaft 204 and the included angle formed between the third rotating mirror 203 and the rotating shaft 204 are different, which facilitates the obtaining of 2 μm laser light in different directions. By obtaining 2 μm narrow-linewidth laser outputs in different directions, one path directly enters a gas measurement cell to measure the concentration of methane gas in the gas measurement cell; one path enters a first four-mirror ring resonator by means of reflective mirrors to obtain 3-5 μm mid-infrared laser light, and then enters the gas measurement cell to measure the concentration(s) of ammonia gas and/or carbon monoxide in the gas measurement cell; and another path enters a second four-mirror ring resonator, and is coupled to a second nonlinear crystal in the second four-mirror ring resonator to generate 6-12 μm far-infrared laser light, and the 6-12 μm far-infrared laser light is introduced into the gas measurement cell to measure the concentration(s) of carbon dioxide, acetylene, ethylene and/or ethane gas in the gas measurement cell. The optical path structure of this embodiment is not illustrated, but is understood with reference to FIG. 1.

Further, a rotation speed of the trihedral rotating mirror 20 is adjusted by the electronic control platform, such that an angle of incident light on each surface of the trihedral rotating mirror 20 continuously changes to control sequential emission of the 2 μm laser light from the trihedral rotating mirror 20 in different directions.

In some embodiments, the step of analyzing the spectra in the spectrometer and then determining the concentration of methane, the concentration of ammonia gas, the concentration of carbon monoxide, the concentration of carbon dioxide, the concentration of acetylene, the concentration of ethylene and/or the concentration of ethane gas in the gas measurement cell includes:
obtaining absorption spectra at three wavelengths by the spectrometer, and obtaining absorption parameters of corresponding wavelengths based on the absorption spectra; and
calculating the concentration of each gas of the multiple gases based on the absorption parameters where the concentration of each gas meets the following formula:

$$M = \frac{2\pi Sc}{Lh\omega B},$$

where M is a concentration of a gas, c is a light speed, h is a Planck constant, $$\omega = \frac{c}{\lambda}$$

is a frequency of a gas absorption peak, λ is an absorption peak wavelength of the corresponding gas, a wavelength corresponds to a type of a gas to be measured, each gas to be measured corresponds to one measurement wavelength, such as 2 μm, 4.235 μm, 4.0298 μm, 6.77 μm, 6.88 μm, 9.74 μm, 10.17 μm, 6.3041 μm or 11.82 μm, B is a gas absorption transition constant, and there may be different gas absorption transition constants corresponding to different gases to be measured, L is a length of a gas sample cell, S is an area enclosed by the gas absorption peak, the area S enclosed by each gas absorption peak may be calculated by using software of the spectrometer, and the concentration of each gas of the multiple gases may be calculated by using the calculation formula.

According to the present disclosure, the light-emitting angle is adjusted by using the electronically controlled rotating mirror, and the three gears are set, such that 2 μm laser light is emitted in different directions under the three gears respectively, thereby generating near-infrared band measurement laser light, mid-infrared band measurement laser light and far-infrared band measurement laser light, and the laser light is inputted into gas measurement cells; measurement laser light in the range of 2-12 μm may be provided by a light source through adjustment, concentrations of multiple gases are simultaneously measured, and the concentration of each gas of the multiple gases can be calculated by using the above calculation formula met by the various measurement gases.

The device embodiment described above is merely schematic, where the unit described as a separate component may or may not be physically separated, and a component displayed as a unit may or may not be a physical unit, that is, the component may be located at one place, or distributed on multiple network units. Some or all of the modules may be selected based on actual needs to achieve the objectives of the solutions of the embodiments.

Finally, it should be noted that the foregoing embodiments are only used to illustrate the technical solutions of the present disclosure, and are not intended to limit the present disclosure. Although the present disclosure is described in detail with reference to the foregoing embodiments, those of ordinary skill in the art should understand that they can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

What is claimed is:

1. A method for measuring concentrations of multiple gases by using an infrared band laser light, comprising the following steps:
    step S1: pumping Ho crystal by using a 1.9 μm narrow-linewidth single thulium-doped solid-state laser to obtain a 2 μm narrow-linewidth near-infrared laser output;
    step S2: adjusting a light-emitting angle by using an electronically controlled rotating mirror, and setting three gears, such that 2 μm laser light is emitted in different directions under the three gears respectively;
    step S3: controlling the light-emitting angle of the 2 μm laser light, such that the 2 μm laser light enters a gas measurement cell at a first emergent angle, and measuring a concentration of methane gas in the gas measurement cell;
    step S4: controlling the light-emitting angle of the 2 μm laser light, such that the 2 μm laser light enters a first four-mirror ring resonator at a second emergent angle, and is coupled to a first nonlinear crystal in the first four-mirror ring resonator to generate 3 μm-5 μm mid-infrared laser light, and introducing the 3 μm-5 μm mid-infrared laser light into the gas measurement cell to measure a concentration of ammonia gas and/or a concentration of carbon monoxide in the gas measurement cell; and
    step S5: controlling the light-emitting angle of the 2 μm laser light, such that the 2 μm laser light enters a second four-mirror ring resonator at a third emergent angle, and is coupled to a second nonlinear crystal in the second four-mirror ring resonator to generate 6 μm-12 μm far-infrared laser light, and introducing the 6 μm-12 μm far-infrared laser light into the gas measurement cell to measure a concentration of carbon dioxide, a concentration of acetylene, a concentration of ethylene and/or a concentration of ethane gas in the gas measurement cell.

2. The method according to claim 1, wherein the first four-mirror ring resonator comprises a first input mirror, a first reflective mirror, a second reflective mirror and a first output mirror that are sequentially arranged along an optical path, wherein the first input mirror is coated with a 2 μm high-transmission film and a 3 μm-5 μm high-reflection film, each of the first reflective mirror and the second reflective mirror is coated with a 3 μm-5 μm high-reflection film, and the first output mirror is coated with a 3 μm-5 μm partial-transmission film.

3. The method according to claim 1, wherein the second four-mirror ring resonator comprises a second input mirror, a third reflective mirror, a fourth reflective mirror and a second output mirror that are sequentially arranged along an optical path, wherein the second input mirror is coated with a 2 μm high-transmission film and a 6 μm-12 μm high-reflection film, each of the third reflective mirror and the fourth reflective mirror is coated with a 6 μm-12 μm high-reflection film, and the second output mirror is coated with a 6 μm-12 μm partial-transmission film.

4. The method according to claim 1, further comprising:
    introducing measurement lights emitted from the gas measurement cell into a spectrometer to obtain spectra of respective measured lights; and
    analyzing the spectra in the spectrometer and then determining the concentration of the methane gas, the concentration of the ammonia gas, the concentration of the carbon monoxide, the concentration of the carbon dioxide, the concentration of the acetylene, the concentration of the ethylene and/or the concentration of the ethane in the gas measurement cell.

5. The method according to claim 1, wherein the electronically controlled rotating mirror comprises an electronic control platform and a trihedral rotating mirror arranged on the electronic control platform, wherein an angle of the trihedral rotating mirror is adjusted by the electronic control platform, such that an angle of incident light on each surface of the trihedral rotating mirror changes to control emission of the 2 μm laser light from the trihedral rotating mirror in different directions.

6. The method according to claim 5, wherein the trihedral rotating mirror comprises a rotating shaft and three rotating mirrors arranged around the rotating shaft, wherein each of mirror surfaces of the rotating mirrors faces a side opposite to the rotating shaft, and an included angle formed between the mirror surface of one of the rotating mirrors and the rotating shaft is directed differently from an included angle formed between the mirror surface of another one of the rotating mirrors and the rotating shaft.

7. The method according to claim 5, wherein a rotation speed of the trihedral rotating mirror is adjusted by the electronic control platform, such that an angle of incident light on each surface of the trihedral rotating mirror continuously changes to control sequential emission of the 2 μm laser light from the trihedral rotating mirror in different directions.

8. The method according to claim 4, wherein the step of analyzing the spectra in the spectrometer and then determining the concentration of the methane gas, the concentration of the ammonia gas, the concentration of the carbon monoxide, the concentration of the carbon dioxide, the concentration of the acetylene, the concentration of the ethylene and/or the concentration of the ethane in the gas measurement cell comprises:

obtaining absorption spectra at three wavelengths by the spectrometer, and obtaining absorption parameters of corresponding wavelengths based on the absorption spectra; and calculating the concentration of each gas of the multiple gases based on the absorption parameters, wherein the concentration of each gas meets the following formula:

$$M = \frac{2\pi Sc}{Lh\omega B},$$

wherein M is a concentration of a gas, c is a light speed, h is a Planck constant, $$\omega = \frac{c}{\lambda}$$

is a frequency of a gas absorption peak, $\lambda$ is an absorption peak wavelength of the corresponding gas, B is a gas absorption transition constant, L is a length of a gas sample cell, and S is an area enclosed by the gas absorption peak.

* * * * *